(12) United States Patent
Hanley et al.

(10) Patent No.: US 7,056,156 B1
(45) Date of Patent: Jun. 6, 2006

(54) VERTICALLY OFFSET EMI PROJECTIONS

(75) Inventors: Michael Francis Hanley, Rochester, MN (US); James Robert Moon, Oronoco, MN (US); Bruce P. Kruger, Oronoco, MN (US); David Peter Gaio, Rochester, MN (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/259,291

(22) Filed: Oct. 26, 2005

Related U.S. Application Data

(60) Provisional application No. 60/633,643, filed on Dec. 6, 2004.

(51) Int. Cl.
*H01R 13/64* (2006.01)
(52) U.S. Cl. .................................................... 439/677
(58) Field of Classification Search ................ 439/677, 439/607–610, 676, 83, 941, 76, 564, 79, 439/76.1, 567
See application file for complete search history.

(56) References Cited

U.S. PATENT DOCUMENTS

| | | | |
|---|---|---|---|
| 5,766,041 A | 6/1998 | Morin et al. ................. | 439/609 |
| 5,767,999 A | 6/1998 | Kayner ........................ | 398/164 |
| 6,201,704 B1 | 3/2001 | Poplawski et al. .......... | 361/753 |
| 6,206,730 B1 | 3/2001 | Avery et al. ................. | 439/609 |
| 6,220,878 B1 | 4/2001 | Poplawski et al. ............ | 439/92 |
| 6,416,361 B1 | 7/2002 | Hwang ........................ | 439/607 |
| 6,623,307 B1* | 5/2003 | Korsunsky et al. ......... | 439/676 |
| 6,604,964 B1* | 8/2003 | Hoshino et al. ............. | 439/607 |
| 6,607,308 B1 | 8/2003 | Dair et al. .................... | 385/92 |
| 6,874,953 B1* | 4/2005 | Dair et al. .................... | 385/92 |
| 6,878,872 B1 | 4/2005 | Lloyd et al. ............... | 174/35 R |
| 6,884,937 B1* | 4/2005 | Mistry et al. .............. | 174/35 C |
| 6,943,287 B1 | 9/2005 | Lloyd et al. ............ | 174/35 GC |

* cited by examiner

*Primary Examiner*—Jean F. Duverne
(74) *Attorney, Agent, or Firm*—Allen, Dyer, Doppelt, Milbrath & Gilchrist, P.A.

(57) ABSTRACT

The present invention relates to an electronic module, such as an opto-electronic transceiver or a copper transceiver, for plugging into a host receptacle. In an effort to eliminate the use of costly and inefficient sheet metal spring fingers for reducing EMI emissions, the present invention proposes to use solid conductive projections extending outwardly from the sides and top of the module housing. However, in highly populated host receptacles, adjacent cages often share a common sheet metal wall, which will deform when a module with a solid projection extending therefrom is inserted, thereby making insertion of an adjacent module very difficult. The present invention eliminates this problem by vertically offsetting projections on the opposite sides of the housing so no two projections are in the same horizontal plane.

20 Claims, 9 Drawing Sheets

VERTICALLY OFFSET EMI PROJECTIONS

CROSS-REFERENCE TO RELATED APPLICATIONS

The present invention claims priority from U.S. Patent Application No. 60/633,643 filed Dec. 6, 2004, which is incorporated herein by reference for all purposes.

TECHNICAL FIELD

The present invention relates to electromagnetic interference (EMI) projections for an electronic module, and in particular to vertically offset EMI projections positioned on opposite sides of the electronic module for use in highly populated electronic module receptacles.

BACKGROUND OF THE INVENTION

Most computers and other high speed electronic equipment, which produce significant amounts of electromagnetic radiation, are enclosed within housings designed to contain the EMI emissions. Openings in the housings designed to receive electronic modules, e.g. electro-optic transceivers, provide leakage points for EMI, which must be plugged. Moreover, EMI is also generated by the modules that are plugged into the openings. Accordingly, considerable care must be taken to reduce EMI levels generated at the interfaces between the equipment housing, the electronic modules, and the transmission cables connected thereto.

Various prior art solutions have been proposed to reduce EMI emissions including providing a ring of spring fingers surrounding the openings in the housing for contacting the modules during use, such as those disclosed in U.S. Pat. No. 5,767,999 issued Jun. 16, 1998 to Kayner, and U.S. Pat. No. 6,206,730 issued Mar. 27, 2001 to Avery et al. Alternatively, a module receptacle in the device housing can be provided with spring fingers for contacting the modules when inserted therein, such as the module receptacle disclosed in U.S. Pat. No. 6,416,361 issued Jul. 9, 2002 to Hwang. U.S. Pat. No. 5,766,041 issued Jun. 16, 1998 to Morin et al, U.S. Pat. No. 6,201,704 issued Mar. 13, 2001 to Poplawski et al, U.S. Pat. No. 6,220,878 issued Apr. 24, 2001 issued to Poplawski et al, and U.S. Pat. No. 6,607,308 issued Aug. 19, 2003 to Dair et al disclose optical transceivers including spring clips extending therefrom for contacting module receptacles to reduce EMI emissions.

"Copper" transceiver's are used as short distance patch cables, typically in datacom or telcom equipment rooms, to establish a link between ports in the same room or even in the same cabinet without having to convert to an optical signal and back again to an electrical signal. A multi-conductor electrical cable extends between a pair of copper transceivers, and is soldered at each end thereof directly to the printed circuit board within each of the copper transceivers. Each copper transceiver housing has the size and features of a typical SFP transceiver housing; however, since the electrical cable is permanently fixed within each housing, the typical bail latching mechanism, requiring approximately 90° of rotation is not suitable.

Highly populated module receptacles, such as those disclosed in U.S. Pat. No. 6,878,872 issued Apr. 12, 2005 to Lloyd et al, and U.S. Pat. No. 6,943,287 issued Sep. 13, 2005 to Lloyd et al, include adjacent cage structures which share a common wall. Such tightly packed cage structures make the use of cage mounted spring fingers difficult to mount and align. Moreover, symmetrically-positioned module-mounted spring fingers usually apply equal and opposite forces to a common wall, which can end up deforming one side or the other making one opening too large and the adjacent opening too small. Furthermore, spring fingers, which are made of thin sheet metal, can become bent out of position making them ineffective or an obstruction during insertion.

An object of the present invention is to overcome the shortcomings of the prior art by providing an electronic module with solid EMI shielding projections, including one extending from each side of the module, which are vertically offset from one another.

SUMMARY OF THE INVENTION

Accordingly, the present invention relates to an electronic module for plugging into a host receptacle comprising:
- a housing for at least partially enclosing the electronic module, and being at least partially electrically conductive;
- a printed circuit board mounted within the housing having an electrical connector at one end thereof for electrically connecting the module to a mating connector in the host receptacle;
- a latch extending from the housing for releasably holding the module in the host receptacle;
- first and second conductive projections extending from opposite sides of the housing for contacting side walls of the host receptacle;
- wherein the first and second conductive projections are vertically offset, whereby no two conductive projections are in the same horizontal plane.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
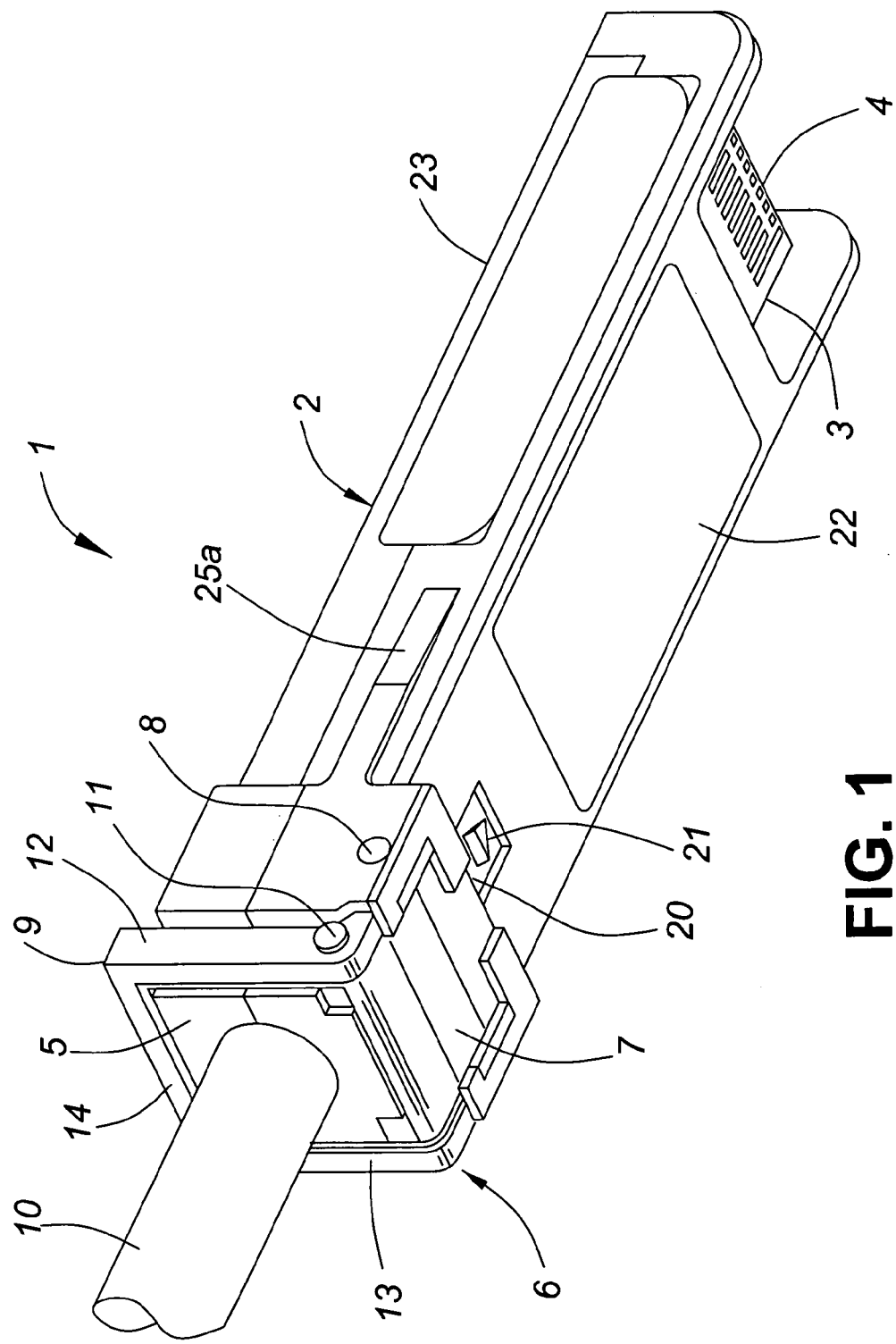
FIG. 1 is an isometric view of an electronic module with a delatching mechanism in accordance with the present invention.
Figure 2:
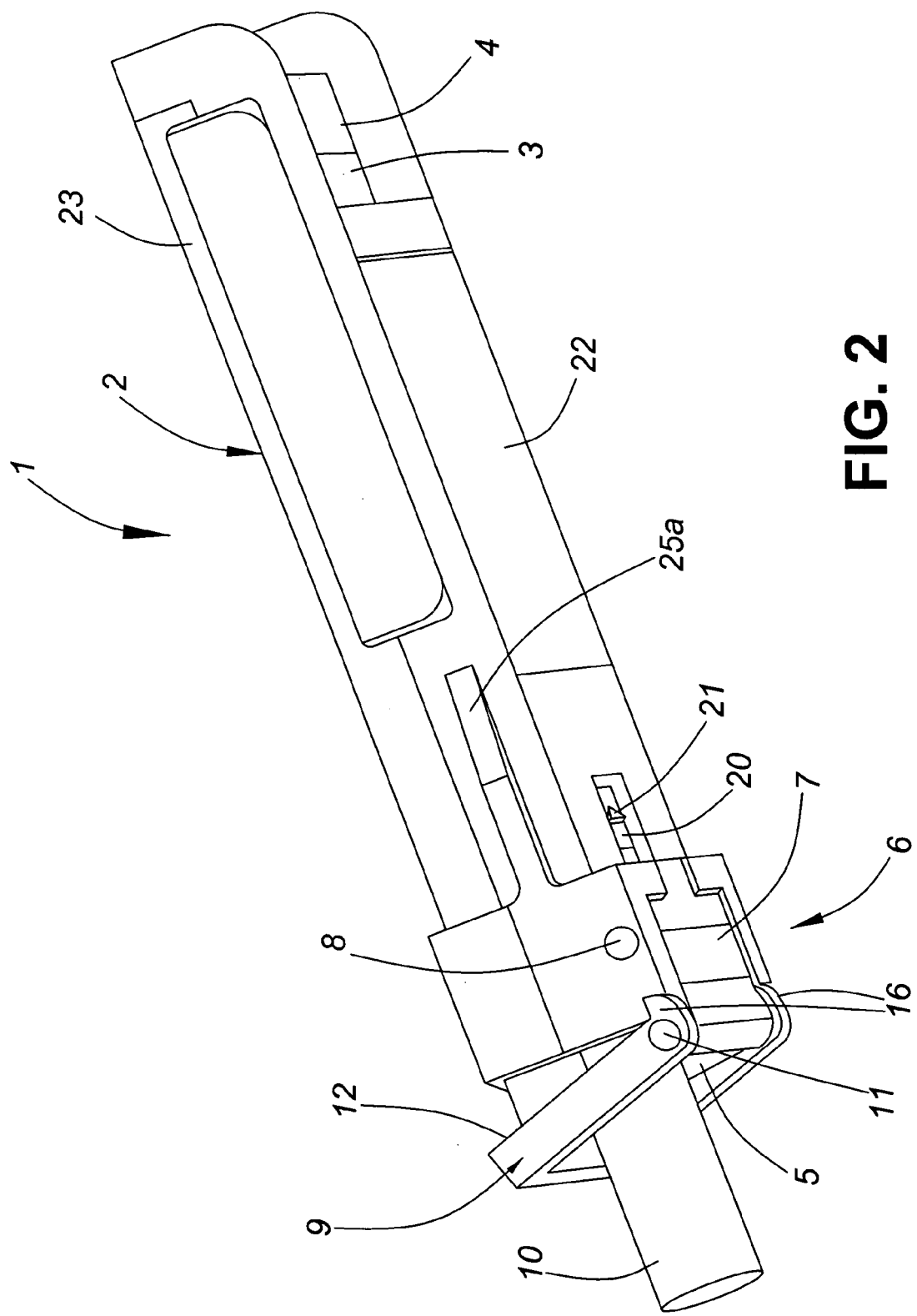
FIG. 2 is an isometric view of the electronic module of FIG. 1 with the delatching mechanism in a release position.

With reference to FIGS. 1 and 2, a pluggable electronic module 1 according to the present invention includes a generally rectangular housing 2, a printed circuit board 3 longitudinally extending in the housing 2, a hot-pluggable electrical connector 4 extending from the rear of the housing 2, and a cable connector 5 mounted on the front of the housing 2. The rear electrical connector 4 can take any suitable form depending upon the type of mating electrical connector on a host printed circuit board; however, the illustrated card edge connector is preferred. The illustrated front cable connector 5 is in the form of a block for receiving a multi-conductor cable 10 soldered to the printed circuit board 3; however, other front cable connectors can be provided depending upon the function of the module 1, e.g. a bi-directional opto-electronic transceiver requires a duplex optical connector (LC or SC), a uni-directional opto-electronic module requires a single (LC or SC) connector. Conventional transceivers would also include some form of electro-optical converter, e.g. a photo-detector and/or a laser; however, copper transceivers do not. The electronic module 1 is slid into a host receptacle, e.g. a cage or guide rail, system with an electrical connector corresponding to the electrical connector 4, which are mounted on the host printed circuit board in a host device.

A de-latching mechanism 6 is mounted on the bottom of the housing 2, and includes a latch 7 pivotally connected proximate the middle thereof to the housing 2 about a first axis defined by a first pivoting pin 8. A lever, preferably in the form of a bail handle 9, extends around the front end of the housing 2, and is pivotally connected to a first end of the latch 7 about a second axis, parallel to the first axis, defined by a second pivoting pin 11. The bail handle 9 includes a pair of side arms 12 and 13, lower ends of which are pivotally connected to the second pivoting pin 11, and upper ends of which are connected to a cross bar 14 extending therebetween. The bail handle 9 can be replaced by a single arm or other form of lever. An eccentric projection 16 extends substantially perpendicularly from each of the lower ends of the side arms 12 and 13, and includes a lower rounded surface 17 and an upper flat camming surface 18 (see FIG. 7). Each projection 16 extends into a recessed area 19, in the housing 2, which includes an abutment surface. Preferably, the recessed area 19 is a rectangular step or indentation formed in the front end of the housing 2, e.g. in the lower front corners of the cable connector block 5. The lower rounded surface 17 enables the projection 16, and therefore the bail handle 9, to act like a first class lever and rotate about the second axis, i.e. with the second pivoting pin 11 acting like a fulcrum, without contacting the wall of the housing 2 until the camming surface 18 engages the abutment surface, as seen in FIG. 2. When the camming surface 18 engages the abutment surface in the recessed area 19, the bail handle 9 is not only able to pivot about the second axis; but, further force on the bail handle 9 causes the bail handle 9 to pivot about a third axis defined by the intersection of the camming surface 18 and the abutment surface. Accordingly, the bail handle 9 also becomes a second class lever with the fulcrum at the intersection of the camming surface 18 and the abutment surface, whereby any added force on the bail handle 9 is applied through the pivot pin 11 to the first end of the latch 7, thereby pivoting the first end of the latch away from the housing 2. A second end of the latch 7 includes a release arm 20 with a latching finger 21, which engages a corresponding latching opening on the host cage or guide rail system. Pivoting the first end of the latch 7 away from the housing 2 into a release position (FIG. 2) causes the release arm 20 and the latching finger 21 to detract into an opening in the housing 2, thereby releasing the latching finger 21 from the latching opening on the host cage enabling the transceiver 1 to be removed therefrom. In the latched position, the latch 7 is recessed into the housing 2 with only the latching finger 21 extending outwardly therefrom. In the unlatched or release position, the first end of the latch 7 is pivoted outwardly from the housing 2, while the latching finger 21 is detracted further into the housing body, whereby the latching finger 21 no longer extends therefrom.

Preferably, the housing 2 is formed by a housing bottom 22 and a housing top 23, joined approximately along a midline of the housing 2. The housing bottom 22 and the housing top 23 are at least partially formed from a conductive material, and preferably comprise cast metal. A solid rectangular conductive projection 25a, extends outwardly from a side of the housing bottom 22 for contacting the host receptacle and providing electromagnetic interference (EMI) protection. The projection 25a extends rearwardly from the cable connector 5 longitudinally along the side of the housing bottom 22. Preferably, the projection 25a includes a sloped rear ramp portion at a leading edge thereof, which gradually decreases in height from the front to the back of the housing 2 to facilitate insertion of the module into a host receptacle, whereby the walls of the cage will engage the ramp portion first and gradually ride up the ramp portion to the main body of the projections. Similarly, solid rectangular projections 25b and 25c, similar to projection 25a, extend longitudinally along the top of a housing top 23 for contacting a top portion of a host receptacle. Another projection 25d (see FIG. 3) extends along a side of the housing top 23, i.e. the opposite side to the projection 25a, for added EMI protection. Projections 25a and 25d make the width to the housing 2 slightly larger than the width of the host receptacle, whereby the projections 25a and 25d frictionally engage the sides of the host receptacle. Typically, no projections are provided on the bottom of the housing bottom 22, which slides on the host printed circuit board, parallel thereto, during insertion. The sides of the housing top 23 and the housing bottom 22 are substantially perpendicular to the host printed circuit board.

Figure 3:
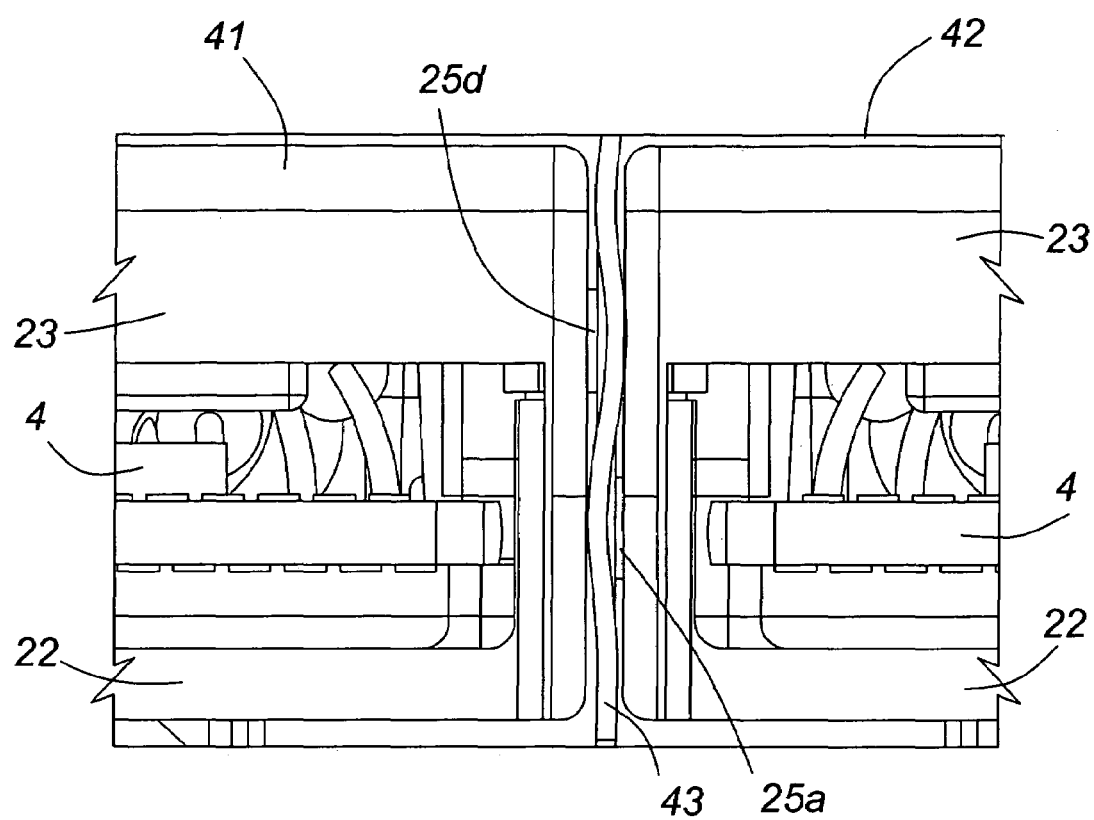
FIG. 3 is a rear view of a pair of the electronic modules of FIGS. 1 and 2 adjacent one another sharing a common receptacle cage wall.
Figure 4:
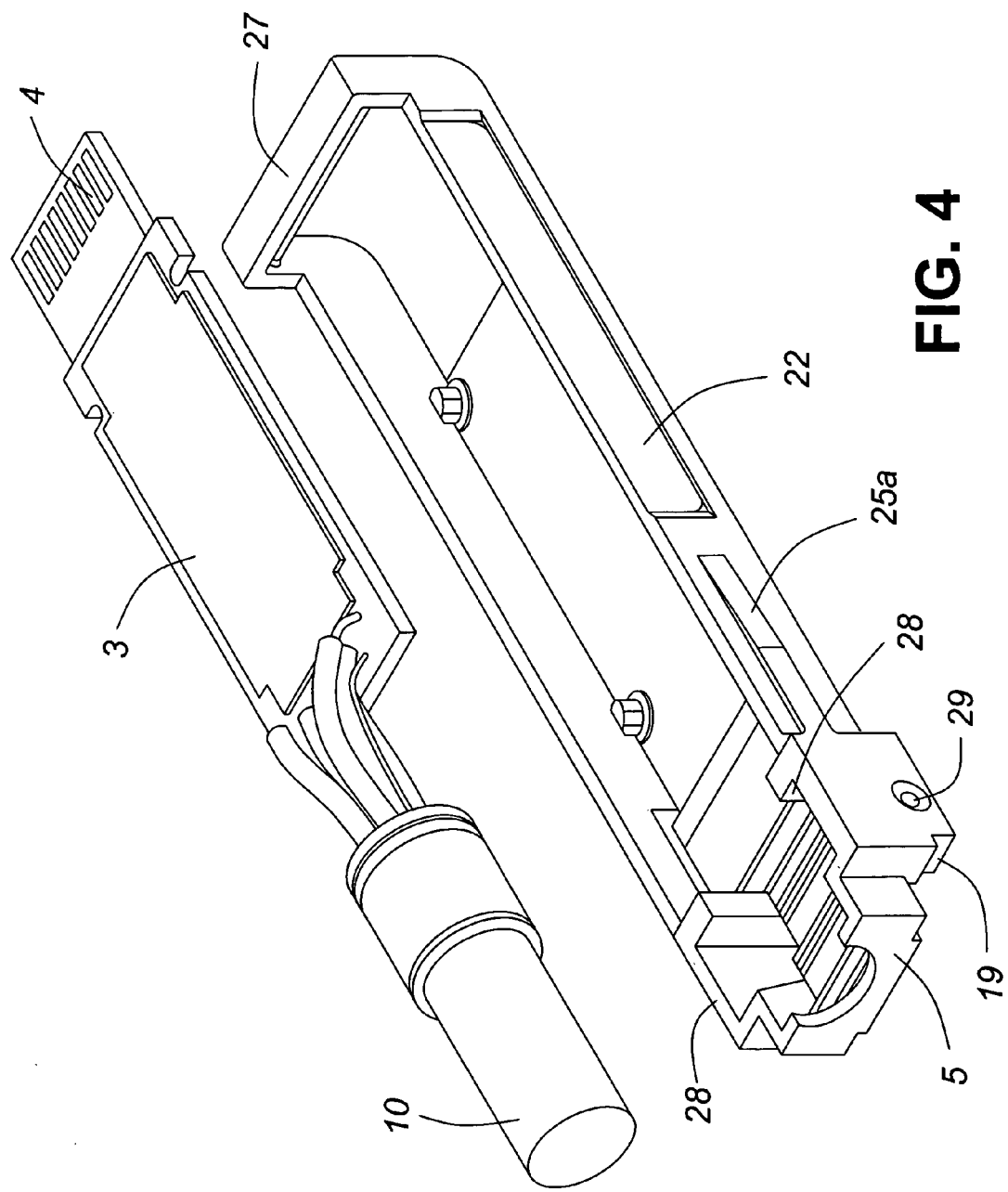
FIG. 4 is an exploded view of components of the electronic module of FIGS. 1 and 2 illustrating a first step in an assembly process.
Figure 5:
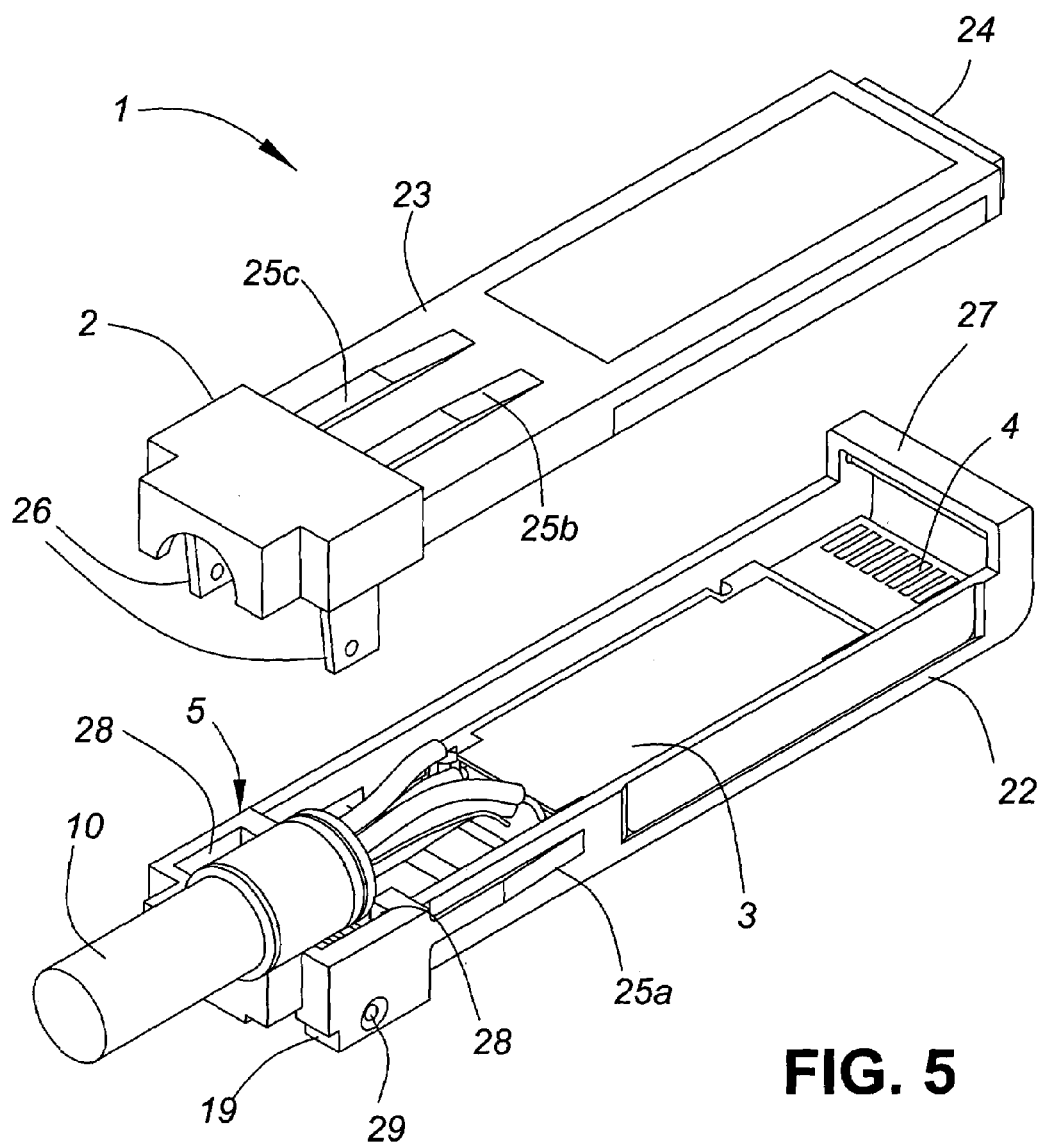
FIG. 5 is as exploded view of components of the electronic module of FIGS. 1 to 2 illustrating a second step in the assembly process.

In highly populated cage assemblies, see FIG. 3, a plurality of electronic modules, e.g. transceivers, can be disposed side-by-side, with the adjacent electronic modules 41 and 42 sharing the same cage wall 43. Unfortunately, when electronic modules are equipped with projections 25a and 25d at the same height and position on both sides of the housing 2, i.e. same horizontal plane, insertion and extraction of the modules 1 becomes very difficult as the projections 25a on one side tend to bend the walls of the cage outwardly into the space designated for the projection of the adjacent module. Accordingly, the walls of the host receptacle will squeeze the module therebetween, requiring excessive force for insertion or extraction. A solution to the problem is to vertically offset the projections 25a and 25d on opposite sides of each housing 2, so that the projections 25a and 25d are not in the same horizontal plane. A simple way to provide this vertical offset is to provide the projection 25a on one side of the housing bottom 23, and to provide the projection 25d on the opposite side of the housing top 22. In this way, as illustrated in FIG. 3, the lower projection 25a of the module 41 is not directly adjacent the upper projection 25d of the module 42, thereby enabling the cage side wall 43 to bend in two vertically spaced apart places.

Figure 6:
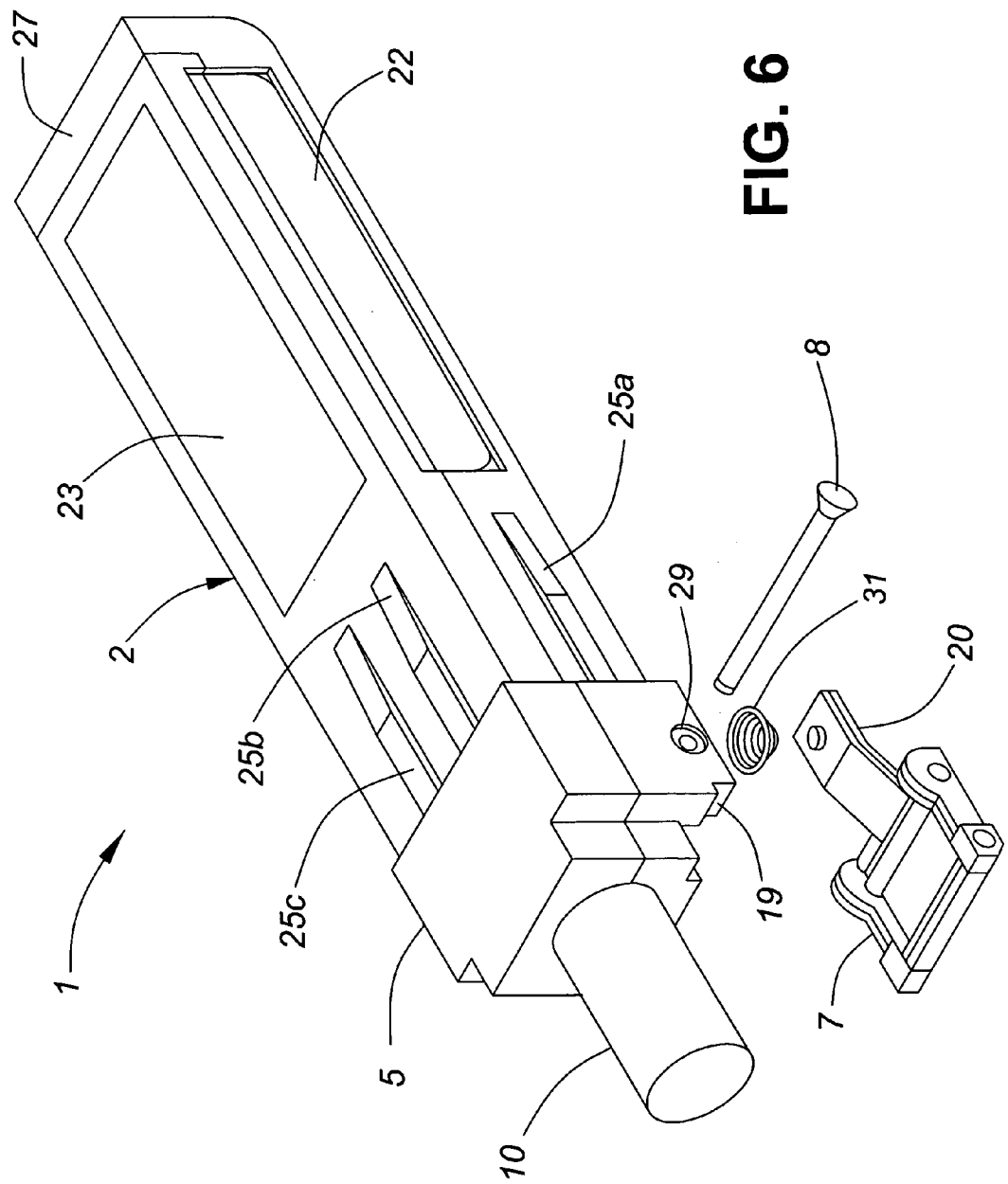
FIG. 6 is as exploded view of components of the electronic module of FIGS. 1 to 2 illustrating a third step in the assembly process.

With reference to FIGS. 4 to 8, the electronic module 1, in the form of a copper transceiver, is assembled by first connecting, e.g. soldering, an end of the multi-conductor cable 10 to the printed circuit board 3, and mounting the assembly into either the housing bottom 22 or the housing top 23. The housing top 23 includes a thin tail section 24, and a pair of generally rectangular tapering ears 26, i.e. tenons, extending therefrom for mating with the housing bottom 22. The tail section 24 has smaller dimensions, i.e. length and width, than the remainder of the housing top 23. A U-shaped bar 27 extends across the back of the housing bottom 22 providing a bearing surface and a hold-down bar for the thin tail section 24 of the housing top 23 During assembly, the tail section 24 is inserted under the bar 27, and the housing top 23 is rotated down until the ears 26 are received in mating recesses 28, i.e. mortises, in the housing bottom 22 (see FIG. 5). With reference to FIG. 6, the first pin 8 is then inserted through holes 29 in the sides of the housing bottom 22, through holes in the ears 26, and through a bushing extending across the middle of the latch 7, thereby securing the housing top 23 to the housing bottom 22, and pivotally mounting the latch 7 to the housing bottom 22. Some form of spring, e.g. coil spring 31, is positioned between the release arm 20 and the housing bottom 22 to spring bias the release arm 20 into a latched position, whereby a sufficient force must be applied to the bail handle 9 to overcome the spring force of the spring 31 to pivot the latch 7 into an unlatched or release position.

Figure 7:
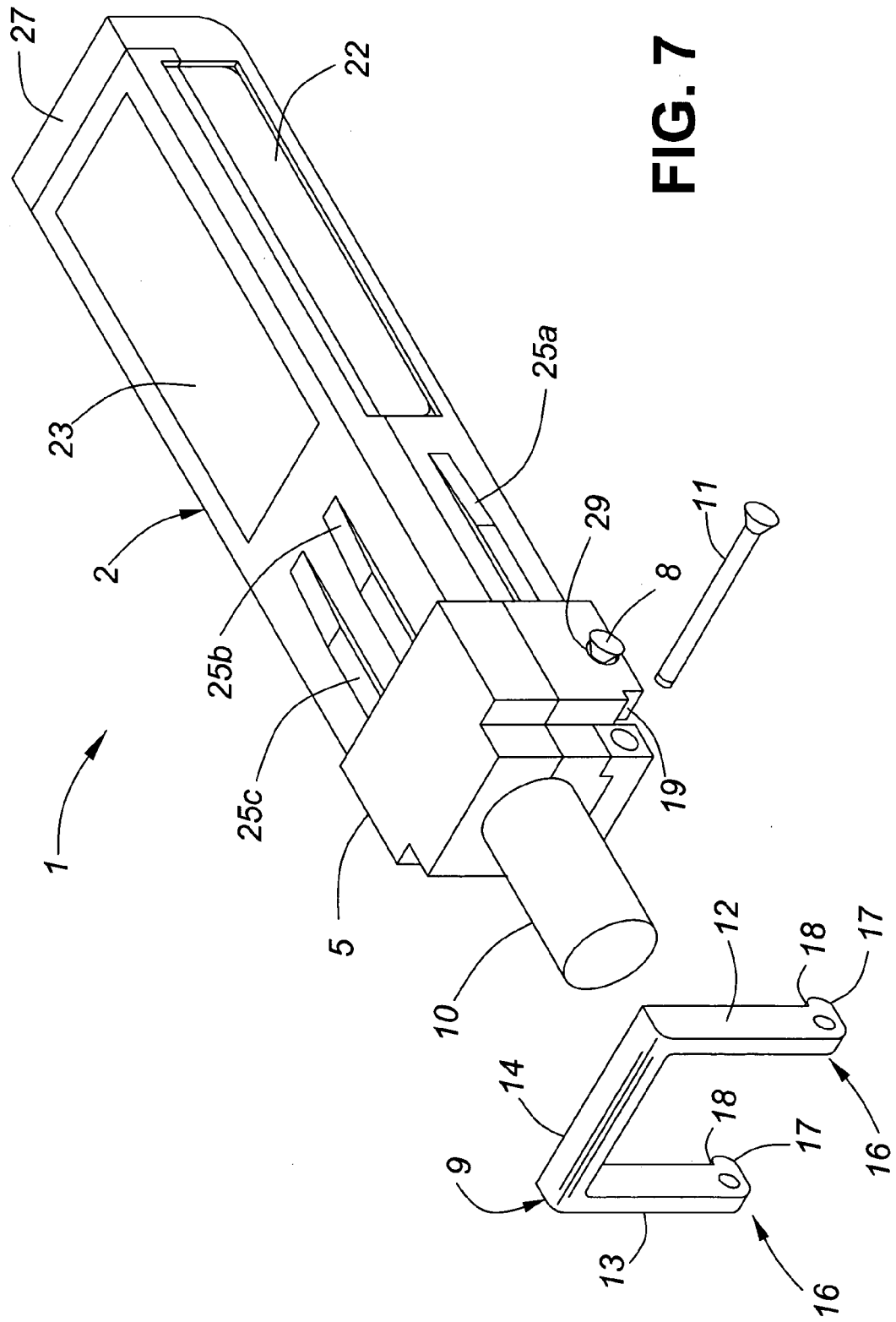
FIG. 7 is as exploded view of components of the electronic module of FIGS. 1 to 2 illustrating a fourth step in the assembly process.

The next step in the assembly, as illustrated in FIG. 7, includes the insertion of the second pivoting pin 11 through a hole in the lower end of the side arm 12, through a bushing in the first end of the latch 7, and through a hole in the lower end of the side arm 13.

Figure 8:
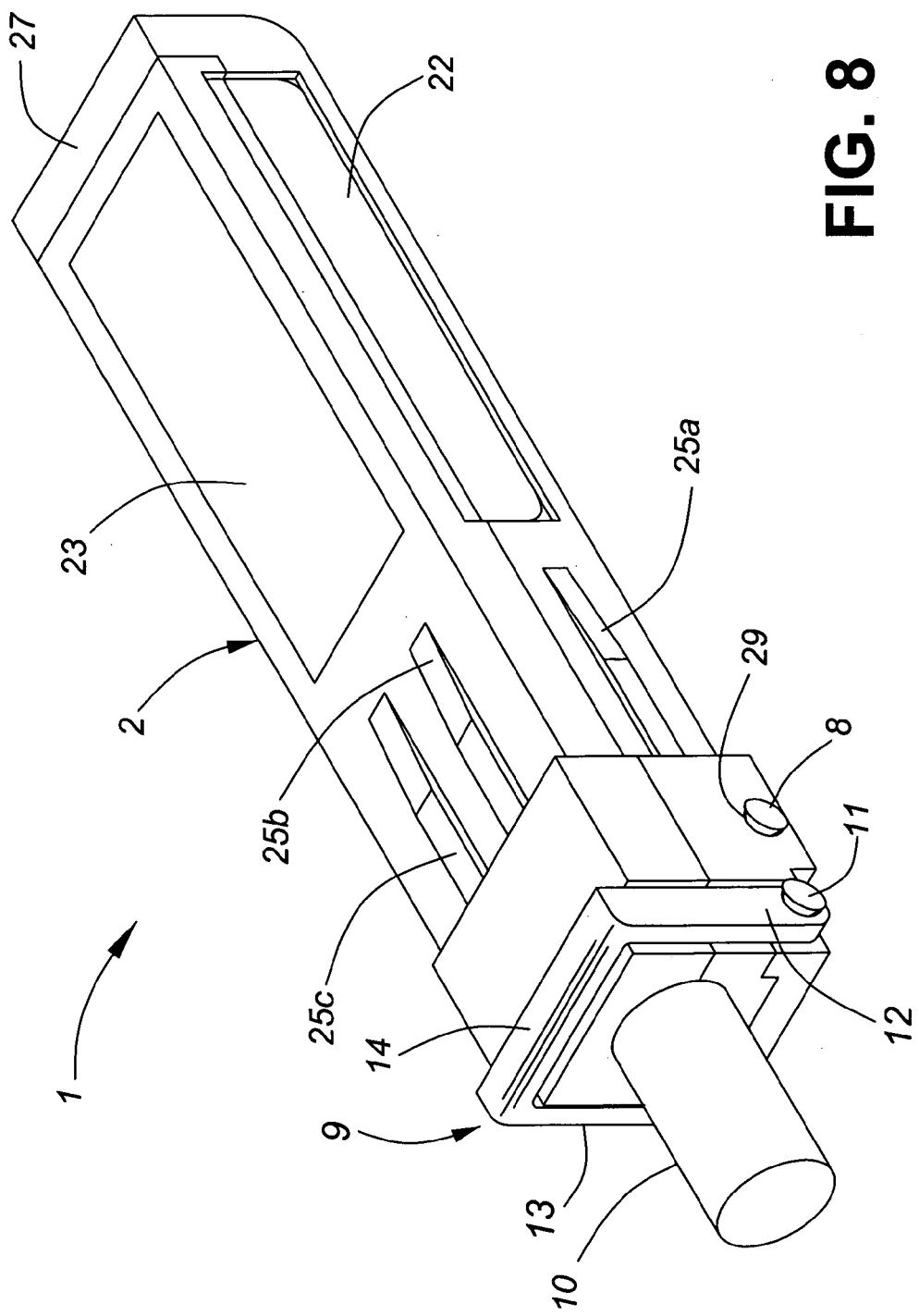
FIG. 8 is as exploded view of components of the electronic module of FIGS. 1 to 2 illustrating a fifth step in the assembly process.

Preferably, the first and second pivoting pins 8 and 11 are identical to each other to simplify the supply and the assembly processes. The first and second pivoting pins 8 and 11 are tapered at the insertion end to facilitate insertion and part alignment, and have a flattened head at the other end for engaging a recessed annular wall in the countersunk hole 29. Moreover, at the head end, the cross section of the first and second pivoting pins 8 and 11 changes from circular to oblong or oval, so that the major diameter of the oval is large enough to form a slight press fit with the holes 29 at the wall of the housing bottom 22 and of the side arm 12. Accordingly, the final assembly step, see FIG. 8, is forcing the in head end of the first and second pivoting pins 8 and 11 into engagement with the side of the housing bottom 22 and the side arm 12, respectively. The first and second pivoting pins 8 and 11 can be pressed out, if necessary, without damaging the housing bottom 22 or the first and second pivoting pins 8 and 11, to facilitate repair or the recycling of parts.

Figure 9:
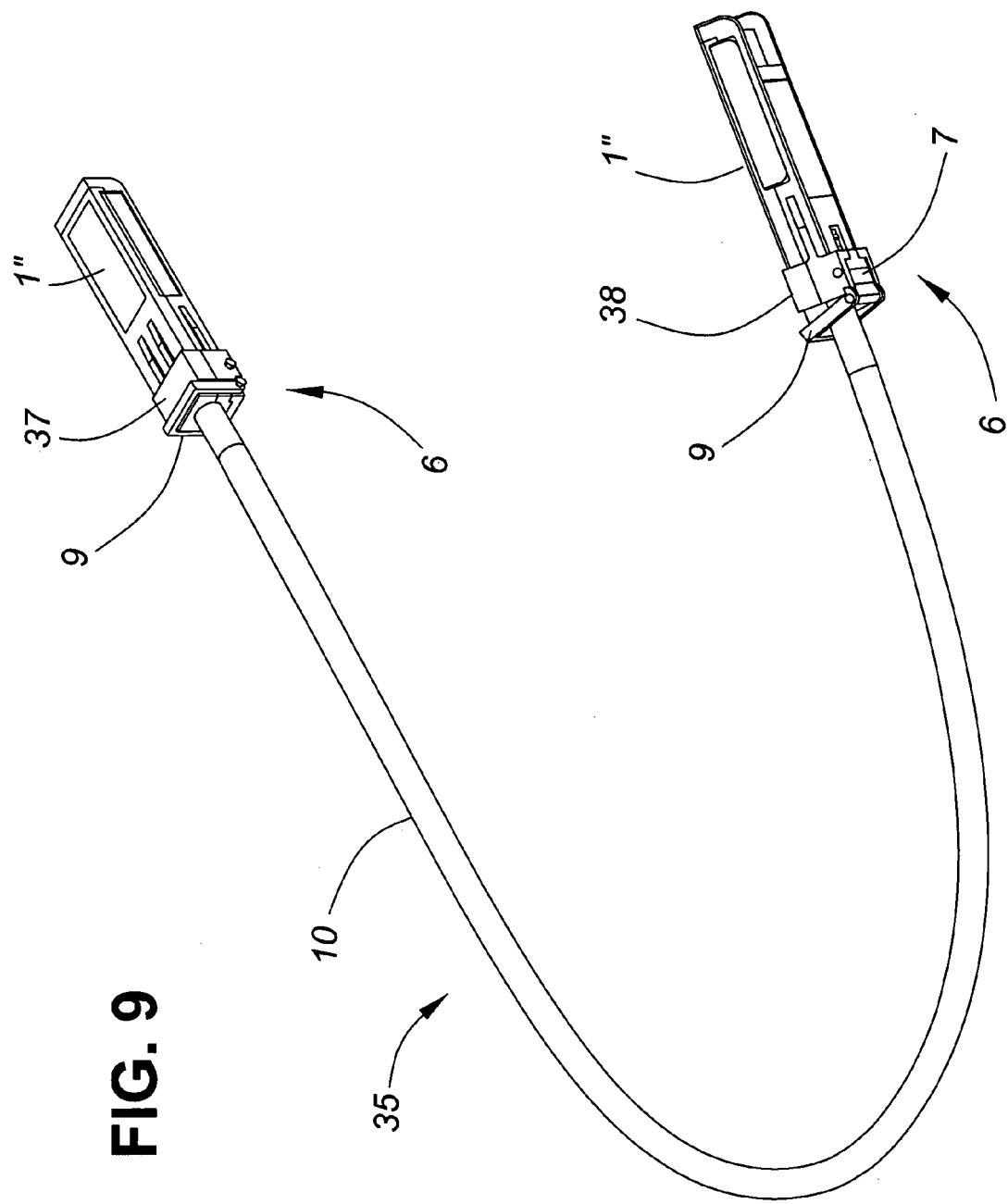
FIG. 9 is a perspective view of a copper transceiver patch cable including the electronic module of FIGS. 1 and 2 on either end thereof.

With reference to FIG. 9, a patch cable 35 comprises the multi-conductor electrical cable 10 and copper transceivers 1' and 1", similar to electronic module 1, on either end thereof. Each of the copper transceivers 1' and 1" includes the delatching mechanism 6, as hereinbefore described with reference to FIGS. 1 to 7. Since the cable 10 is permanently installed inside the copper transceivers 1' and 1", it is imperative that each bail lever 9 need only be rotated through a small angle, e.g. 5° to 45°, preferably 10° to 30°, before unlatching the latch 7, as the cable 10 prevents the bail lever 9 from reaching a horizontal position.

We claim:

1. An electronic module for plugging into a host receptacle comprising:
    a housing for at least partially enclosing the electronic module, being at least partially electrically conductive;
    a printed circuit board mounted within the housing having an electrical connector at one end thereof for electrically connecting the module to a mating connector in the host receptacle;
    a latch extending from the housing for releasably holding the module in the host receptacle;
    first and second conductive projections extending from opposite sides of the housing for contacting side walls of the host receptacle;
    wherein the first and second conductive projections are vertically offset, whereby no two conductive projections are in the same horizontal plane.

2. The module according to claim 1, wherein each of the first and second projection includes a ramp at a leading edge thereof to facilitate insertion of the housing into the host receptacle.

3. The module according to claim 1, wherein the housing comprises a top section mounted on a bottom section; and wherein the first projection is on the top section, and the second projection is on the bottom section.

4. The module according to claim 3, wherein the top section includes a first connector, and the bottom section includes a second connector, which interlocks with the first connector; wherein a first pin, defining a first axis, extends through the bottom section, and the first and second connectors for holding the top and bottom sections together.

5. The module according to claim 4, wherein the first pin also extends through the latch for pivotally connecting the latch to the housing about the first axis.

6. The module according to claim 1, wherein the housing comprises a top section with a first connector, and a bottom section with a second connector, which interlocks with the first connector;
    wherein a first pin, defining a first axis, extends through the bottom section, and the first and second connectors, for holding the top and bottom sections together.

7. The module according to claim 6, wherein the first pin also extends through the latch for pivotally connecting the latch to the housing about the first axis.

8. The module according to claim 6, wherein the first pin has an oblong end forming a press fit connection with the bottom section.

9. The module according to claim 6, further comprising a lever pivotally connected to the housing engaged with a first end of the latch for rotating the latch to disengage the housing from the host receptacle.

10. The module according to claim 9, further comprising a hook extending from a second end of the latch for engaging a mating latching member on the host receptacle.

11. The module according to claim 9, wherein the lever comprises a bail, which includes first and second side arms pivotally connected to the latch via a second pin, which extends through the latch and the first and second side arms.

12. The module according to claim 11, wherein the second pin has an oblong end forming a press fit connection with the second side arm.

13. The module according to claim 1, further comprising a lever pivotally connected to the housing engaged with a first end of the latch for rotating the latch to disengaging the housing from the host receptacle.

14. The module according to claim 13, further comprising a hook extending from a second end of the latch for engaging a mating latching member on the host receptacle.

15. The module according to claim 13, wherein the lever comprises a bail, which includes first and second side arms pivotally connected to the latch via a pivoting pin, which extends through the latch and the first and second side arms.

16. The module according to claim 15, wherein the pivoting pin has an oblong end forming a press fit connection with the second side arm.

17. The module according to claim 13, further comprising a cable fixed to the printed circuit board extending outwardly from the housing preventing the lever from reaching a horizontal position.

18. A patch cable for electrically connecting first and second host devices comprising:
 a first electronic module as defined in claim 1 for plugging into the first host device;
 a second electronic module as defined in claim 1 for plugging into the second host device; and
 a multi-conductor cable having a first end fixed to the printed circuit board of the first electronic module, and a second end fixed to the printed circuit board of the second electronic module.

19. The patch cable according to claim 18, wherein each of the first and second projections of the first and second modules includes a ramp at a leading edge thereof to facilitate insertion of the housings into the first and second host receptacles.

20. The patch cable according to claim 18, wherein each housing comprises a top section mounted on a bottom section; and wherein each first projection is on each top section, and each second projection is on each bottom section.

\* \* \* \* \*